July 22, 1924.  1,502,088

V. V. COLBY

CUTTING AND SAWING DEVICE

Filed Feb. 14  1921   2 Sheets-Sheet 1

Witness:  Inventor:
Vincent V. Colby,
By Kummler & Kummler
Attys.

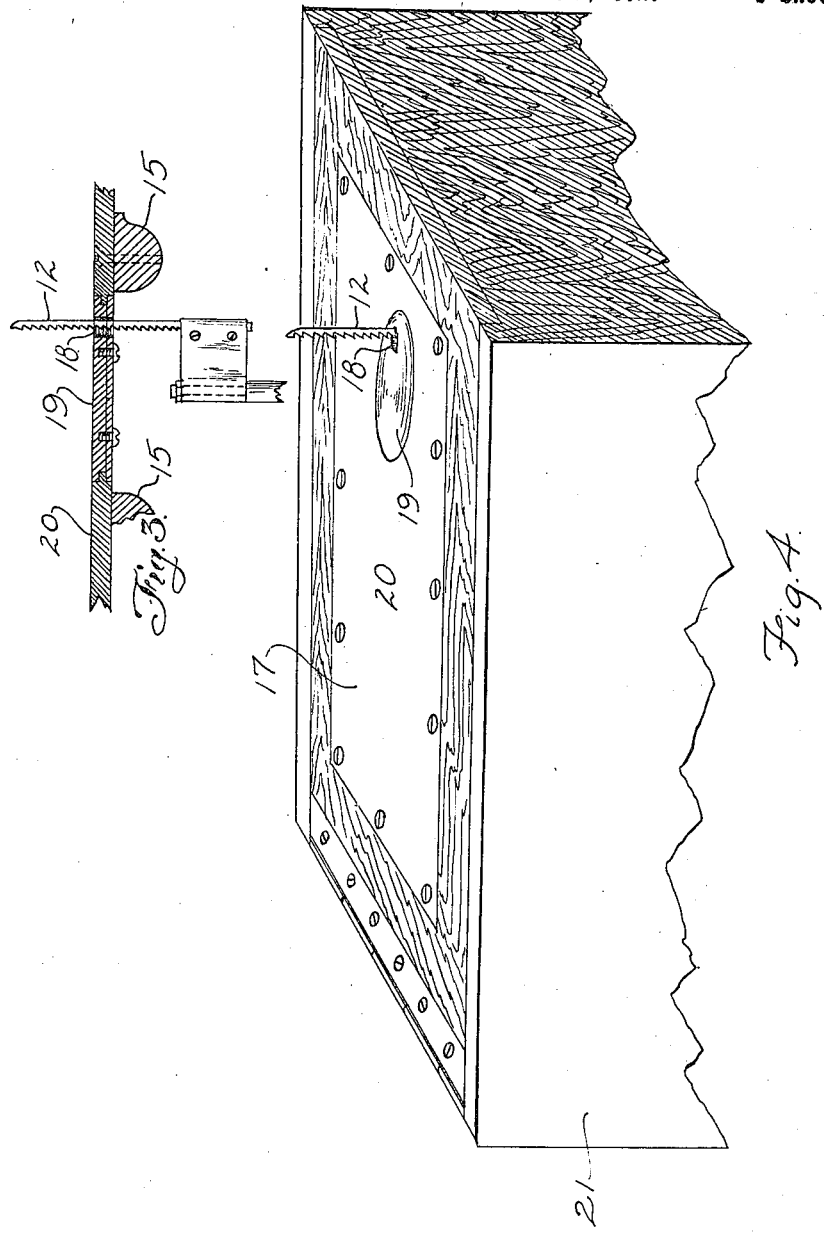

Patented July 22, 1924.

1,502,088

UNITED STATES PATENT OFFICE.

VINCENT V. COLBY, OF CHICAGO, ILLINOIS, ASSIGNOR TO CHARLES A. BROWN, OF HINSDALE, ILLINOIS.

CUTTING AND SAWING DEVICE.

Application filed February 14, 1921. Serial No. 444,996.

*To all whom it may concern:*

Be it known that I, VINCENT V. COLBY, a citizen of the United States of America, and a resident of Chicago, county of Cook, and State of Illinois, have invented certain new and useful Improvements in Cutting and Sawing Devices, of which the following is a specification.

This invention relates to mechanism for operating reciprocating tools such as knives or saws, and is useful for cutting out patterns of wood, metal or other material, and for doing much of the work which is ordinarily effected by means of band-saws and scroll-saws.

The purpose of the invention is to provide a sawing or cutting device by means of which kinds of work ordinarily done by band-saws and the like are greatly facilitated.

This object is accomplished by the device shown in the accompanying drawings, in which—

Figure 3 is a fragmentary detail partly in section illustrating the manner in which the tool extends through the table; and Figure 4 is a perspective view of the table top showing the tool protruding therethrough.

Figure 1:
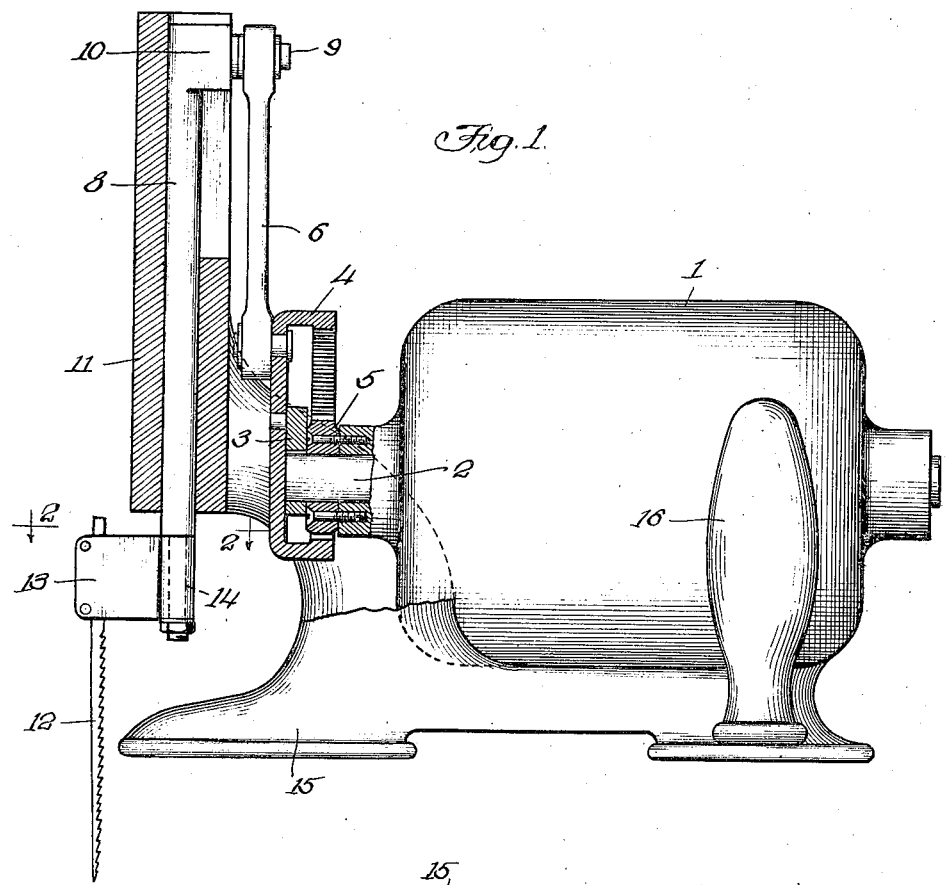
Figure 1 shows in side elevation and partly in section a motor equipped in accordance with the present improvement.

The design shown in the drawings relates to improved means for operating reciprocating tools and consists preferably of an electric motor having a connection for reciprocating a tool holder, a tool in this holder being supported eccentrically so that it not only reciprocates with the holder but is free to swing around a center eccentric with respect to the axis of the tool. The device is also provided with a support in which is journaled a circular plate having an aperture at one side and through which the tool projects. This plate serves as a support for articles which are cut by the tool, and the plate may swing freely with the tool around the eccentric support therefor.

Figure 2:
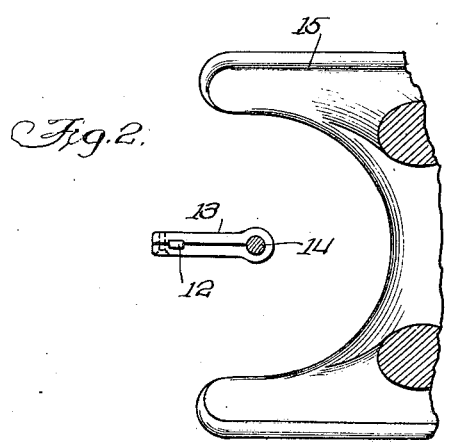
Figure 2 is a sectional detail on the line 2—2 of Figure 1.

Referring to the drawings, the motor 1 is shown as having its shaft 2 provided with a crank or eccentric 3 upon which is journaled an internal gear 4. This gear meshes with an external gear 5 fixed to the motor frame. The gear 5 has half the pitch diameter as the gear 4, and accordingly there is a two to one reduction between the motor shaft 2 and gear 4. The pitman 6 is journaled eccentrically on gear 4 and serves to transmit motion from the gear to a reciprocating bar 8 which has a pin 9 on its head 10. The upper end of pitman 6 is journaled on the pin 9. Bar 8 is guided in the vertical bearing 11 integral with the motor frame. The tool 12 is clamped in a holder 13 eccentric to the axis of bar 8 on which at its lower reduced end 14 the holder 13 is journaled. The tool is therefore free to swing around the axis of reciprocating rod 8, and the feet 15 of the motor frame, as shown in Figure 2, are so designed as to not interfere with circular motion of the tool around rod 8.

The motor with its tool as described is inverted and fixed below a support which is provided with a circular guide for the tool and support for the work which is concentric with the axis of rod 8, this guide being free to turn around its axis with the tool as it swings around its eccentric support. Accordingly, the device may be mounted on the lower surface of the lid 17 of the boxlike structure 21 shown in Figure 4. The tool 12 in this view is shown as projecting upwardly through a key-hole-shaped aperture 18 in one side of a circular plate 19 journaled in the metal plate 20 forming part of lid 17.

In the operation of the device the tool is reciprocated and is likewise free to swing around its journal 14 according to the direction of pressure between the tool and the article operated upon. When so swung around its journal, plate 19 rotates with the tool but irrespective of this rotary motion of the plate, this circular plate with the lid 17 forms a flush surface over which the article operated upon may be moved in any direction, the tool always cutting directly against the line of motion and never being subject to breakage due to lateral pressure.

Since the tool is free ended, it will be clear that in making an inside cut, as in mortising, the stock, with a preliminary drilled hole, may be quickly set over the same and simply moved against it in the direction opposing the desired direction of cut, with full vision, until the mortise is completed, whereupon the stock may be quickly lifted away from the saw.

I claim:

1. In a device of the class described, a reciprocating member, a support carried by said member and mounted thereon to rotate about an axis parallel to the reciprocation of said member, a free-ended saw with teeth in substantially a straight line mounted on said support with the line of its teeth parallel to and distanced from said axis, a table and a disk mounted flush with said table and rotatable on said axis and having a slot therein through which said saw extends, said disc being free to rotate by said saw turning with said rotatable support.

2. In a device of the class described, a table, a saw extending through said table and having its upper end free, means for supporting said saw below said table, and means for operating said saw and permitting said saw to follow the work automatically in substantially any direction.

3. In a device of the class described, a table, a saw extending through said table and having its upper end free, means for supporting said saw below said table, and means for operating said saw, said supporting means swinging on an axis distanced from said saw and moving said saw to follow the work by its pressure thereagainst.

4. In combination, a table, a rotatable disc in said table, said disc having an aperture therethrough offset from the axis of rotation, a support below said table pivoted for rotation about the same axis as said disc, a free-ended saw on said support projecting up through said aperture, and means for reciprocating said support and saw parallel to the axis of rotation of the support and disc.

5. In combination, a table, an opening in said table, a support below said table rotatable about an axis passing through said opening, a free-ended saw on said support passing through said opening and offset from the axis of rotation of said support, and means for reciprocating said support and saw substantially parallel to the axis of rotation of said support.

Signed at Chicago this 11th day of Feb. 1921.

VINCENT V. COLBY.